L. BAILEY.
Carpenter-Plane.

No. 202,918. Patented April 30, 1878.

Witnesses:
Rob't J. Gaylord
M. F. Dooley

Inventor:
L. Bailey,
By W. E. Simonds
Atty.

UNITED STATES PATENT OFFICE.

LEONARD BAILEY, OF HARTFORD, CONNECTICUT.

IMPROVEMENT IN CARPENTERS' PLANES.

Specification forming part of Letters Patent No. 202,918, dated April 30, 1878; application filed February 20, 1878.

*To all whom it may concern:*

Be it known that I, LEONARD BAILEY, of Hartford, in the county of Hartford and State of Connecticut, have made certain new and useful Improvements pertaining to Carpenters' Planes, of which the following is a specification, reference being had to the accompanying drawings, where—

Figure 1:
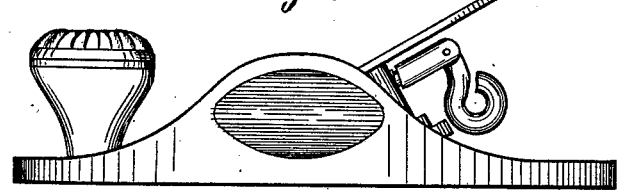
Figure 2:
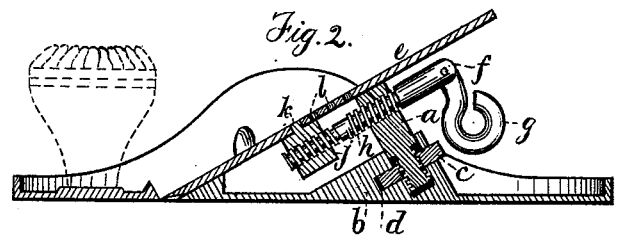
Figure 3:
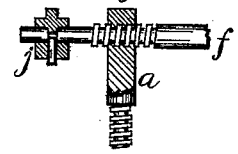

Figure 1 is a side view of the plane. Fig. is a central longitudinal section of the plane. Fig. 3 is a detail view of a modification hereinafter described.

The invention is a new adjustment for plane bits or irons, particularly adapted to metallic planes.

The letter *a* denotes a stud borne and having longitudinal play in a corresponding socket in the riser *b*. Its lower end bears a male screw-thread meshing into the round nut *c*, which lies in the socket *d* in the riser *b*. It is by the rotation of this nut by the hand or fingers of the operator that the stud-pin *a* is advanced or retracted. The top of this stud bears, when advanced, against the under side of the bit or iron *e*, thus availing to fasten it in place. When this stud-pin is retracted its hold on the bit is loosened. This stud-pin bears near the top a screw-pin, *f*, furnished with an operating-handle, *g*. When this pin *f* runs through the stud *a* its thread is right-handed, denoted by the letter *h*. Below this right-hand thread the pin is furnished with a left-hand thread, and this left-hand thread bears the button *j*, and this button bears the stud or pin *k*, entering one or the other of the series of holes *l* in the plane-bit.

This use of a right and left hand thread enables me to adjust the plane-bit with great rapidity and small movement, and is available for this purpose, whether it be hung in the stud *a* or run through a rigid projection from the plane-body.

This use of a right and left hand thread also enables me to make the screw work in the stud without pinning it in or placing collars on the screw-shaft each side of the stud. This is not only an advantage in making, but also in using, the screw-shaft being removable without taking out such a pin or taking off such collars.

The pin *f* may, in some cases, have but a single thread, and in such case the button *j* is made stationary on the pin, but in such manner that the pin can turn in the button. This can be attained by the modification shown in Fig. 3.

There is a feature of novelty connected with the handle *g*. This handle is hinged or pivoted to the end of the screw *f*. Ordinarily it stands out like a crank-arm, as shown in the drawings, and forms a ready means of rotating the screw *f*; but it has a peculiar advantage when a screw or other rotating shaft is employed in a plane adjustment and in a relation similar to that herein described.

When the plane-bit is adjusted high up in the plane, so that its upper end covers the joint or hinge between the screw and this handle, obviously this handle cannot have a complete rotation while standing out at any considerable angle from the screw. In such case the handle is rotated crank fashion till it comes up against the bit. It is then swung over on its pivot to the opposite side of the screw, when its rotation crank fashion can be continued.

I am aware that to accomplish the adjustment of a plane-bit within contracted limits a differential screw has been used, such screw consisting of a hollow or tubular thumb-screw, threaded both interiorly and exteriorly, and engaging a screw carrying the bit-connection. My screw differs from this, in so far as it is differential, in that it is a double-threaded screw of one piece, one of its threaded portions working within the bearing that supports the screw, and the other entering and working within a nut carrying the plane-bit.

I claim as my invention—

1. The double-threaded adjusting-screw *f*, made in one piece, and having a right-hand thread working in its support or bearing and a left-hand thread working in the bit-carrying nut, in combination with a plane body and bit, substantially as described.

2. In combination, stud *a*, nut *c*, adjusting-screw *f*, button *j*, bearing-pin *k*, and the plane-bit, all substantially as described.

3. The combination of the plane-bit, the button *j*, the stud *a*, and the rotating shaft *f*, provided with the pivoted handle *g*.

LEONARD BAILEY.

Witnesses:
 ROBT. F. GAYLORD,
 WM. E. SIMONDS.